(12) United States Patent
Squire et al.

(10) Patent No.: US 7,678,354 B2
(45) Date of Patent: Mar. 16, 2010

(54) INTEGRATED LIME KILN PROCESS

(75) Inventors: Merrill Squire, Salt Lake City, UT (US); Alain Charette, Joliette (CA)

(73) Assignee: Graymont (QC) Inc., Joliette, Quebec (CA)

( * ) Notice: Subject to any disclaimer, the term of this patent is extended or adjusted under 35 U.S.C. 154(b) by 754 days.

(21) Appl. No.: 11/498,718

(22) Filed: Aug. 4, 2006

(65) Prior Publication Data

US 2008/0031794 A1    Feb. 7, 2008

(51) Int. Cl.
*B01D 53/50* (2006.01)

(52) U.S. Cl. ........... 423/244.07; 423/170; 423/171; 423/320; 423/571; 423/522; 432/115; 432/117; 95/90; 95/107; 95/137; 95/134; 95/131

(58) Field of Classification Search ............. None
See application file for complete search history.

(56) References Cited

U.S. PATENT DOCUMENTS

| | | | |
|---|---|---|---|
| 1,585,754 A | 5/1926 | Bonus et al. | |
| 2,235,993 A | 3/1941 | Harris | |
| 3,986,819 A * | 10/1976 | Heian | 432/14 |
| 4,541,245 A | 9/1985 | Becker et al. | |
| 4,717,559 A | 1/1988 | Cummings et al. | |
| 4,745,869 A | 5/1988 | Dilmore et al. | |
| 4,962,279 A | 10/1990 | Anderson et al. | |
| 5,840,100 A * | 11/1998 | Arencibia, Jr. | 95/225 |
| 6,601,541 B2 | 8/2003 | Burdis et al. | |
| 7,013,817 B2 * | 3/2006 | Stowe et al. | 110/345 |
| 2005/0031515 A1* | 2/2005 | Charette | 423/244.07 |

* cited by examiner

*Primary Examiner*—Melvin C Mayes
*Assistant Examiner*—Smita Patel
(74) *Attorney, Agent, or Firm*—Rothwell, Figg, Ernst & Manbeck, P.C.

(57) ABSTRACT

A process and system for recovering waste heat from a kiln used for lime or cement production. The system unifies the kiln, a waste heat recovery and power generation circuit and a dry scrubber for scrubbing the pollutants from the kiln offgas. Essentially, the system employs the boiler component of the waste heat recovery and power generation circuit as a heat exchanger to recover the waste heat from the kiln, which is used to drive the steam turbines. The heat absorption from the latter stage lowers the temperature of the kiln offgas sufficiently for optimum performance from the scrubber. The presence of lime particles in the offgas effectively protects the boiler tube surfaces from corrosion which would occur at optimum scrubber temperatures, and subsequently provides the lime required as a scrubbing medium for the dry scrubber. Further, the efficient scrubbing allows for the use of any fuel for firing the kiln inclusive of high sulphur content compounds. A process for effecting the technology is also provided.

15 Claims, 5 Drawing Sheets

INTEGRATED LIME KILN PROCESS

FIELD OF THE INVENTION

The present invention relates to a process and system for recovering waste heat from a kiln used for lime or cement production fuel and more particularly, the present invention relates to the unification of known elements such as a kiln, a waste heat recovery and power generation circuit and a dry, semi-dry, or semi-wet scrubber (collectively "dry scrubber" herein) for scrubbing the pollutants from the kiln offgas, in a previously uncombined manner.

BACKGROUND OF THE INVENTION

It is well known that in North America, lime and cement is typically produced in rotary kilns. The primary energy consuming reaction in both processes is the conversion or calcination of limestone ($CaCO_3$) to lime (CaO) also known as quicklime. The intense heat and energy needed to drive the reaction requires the use of fossil fuels. A byproduct of these processes is fine particulates trapped in air pollution control systems of rotary kilns commonly known as lime kiln dust (LKD) and cement kiln dust (CKD). LKD and CKD contain, primarily, limestone, fly ash from the fuel and quicklime.

The required use of fossil fuels can present pollution concerns and, depending upon the type of fuel used, may require a further unit operation, such as flue gas desulfurization, to satiate the problem. In furtherance, typical exit temperatures of kilns exceed that which can be effectively used for dry scrubbers. The dry scrubbing operation is best suited for temperatures in the range of 350° F. to 400° F. The discharge or offgas temperature of a long, straight-type kiln, for example can be in excess of 1000° F.

To achieve effective dry scrubber operation, the excess heat must be extracted from the offgas. Typically, it is dumped to the surrounding environment and wasted.

This is less energy-efficient, represents a sub-optimum economic condition, and contributes to long-term environmental concerns such as the production of green house gases.

Conventional boilers are commonly used to capture heat contained in offgases from fossil fuel-fired sources. Operational parameters and materials of construction must be carefully controlled in order to avoid corrosive chemical attack. Typically of greatest concern is in-situ formation of sulfurous acidic compounds. When burning fossil fuels containing sulfur, corrosive acidic formations will occur on boiler surfaces that are below acid dew temperature.

A gas scrubbing method is established in United States Patent Publication No. US2005/0031515, published Feb. 10, 2005, and incorporated herein by reference.

SUMMARY OF THE INVENTION

One object of the present invention is to provide an improved technique for recovering waste heat from a kiln and using the heat energy to generate power while concurrently optimizing pollutant dry scrubbing such that previously undesirable fuels can be employed for firing the kiln. Lime particles contained in the LKD or CKD emanating from the kiln acts to protect the boiler heat exchange surfaces from corrosive acidic attack and subsequently can be used as the scrubbing medium in the dry scrubber.

Generally, a further object of one embodiment is to provide an integrated kiln process, comprising providing waste heat recovery circuit; the circuit including a boiler and turbine generator, introducing kiln discharge gas into the boiler, the discharge gas containing kiln dust, cooling the discharge gas to a temperature sufficient for introduction into a dry scrubber, absorbed heat within boiler water being transferred to the turbine generator, whereby the boiler functions as a heat exchanger and scrubbing the discharge gas.

A still further object of one embodiment of the invention is to provide a system for recovery of thermal energy from a kiln for power generation, comprising a kiln, a waste heat recovery circuit including a boiler and a steam turbine, the boiler for receiving discharge gas from the kiln and generating steam for the turbine and a dry scrubber for receiving cooled discharge gas at a temperature from the boiler suitable for optimizing dry scrubber efficiency.

Yet a further object of one embodiment of the present invention is to provide a method for dry scrubbing gas generated from the combustion of high sulphur based fuel in a kiln process, comprising the steps of: providing a waste heat recovery circuit, the circuit including a boiler and turbine generator; providing a high sulphur content fuel for firing the kiln; introducing kiln offgas into the boiler, the offgas containing kiln dust and lime particles; collecting lime particles on heat exchange surfaces of the boiler to reduce acidic attack of the surfaces at temperatures below acid dew point; and scrubbing the offgas.

Having thus generally described the invention, reference will now be made to the accompanying drawings illustrating preferred embodiments.

BRIEF DESCRIPTION OF THE DRAWINGS

Similar numerals are indicative of similar elements.

DETAILED DESCRIPTION OF THE PREFERRED EMBODIMENTS

Figure 1:
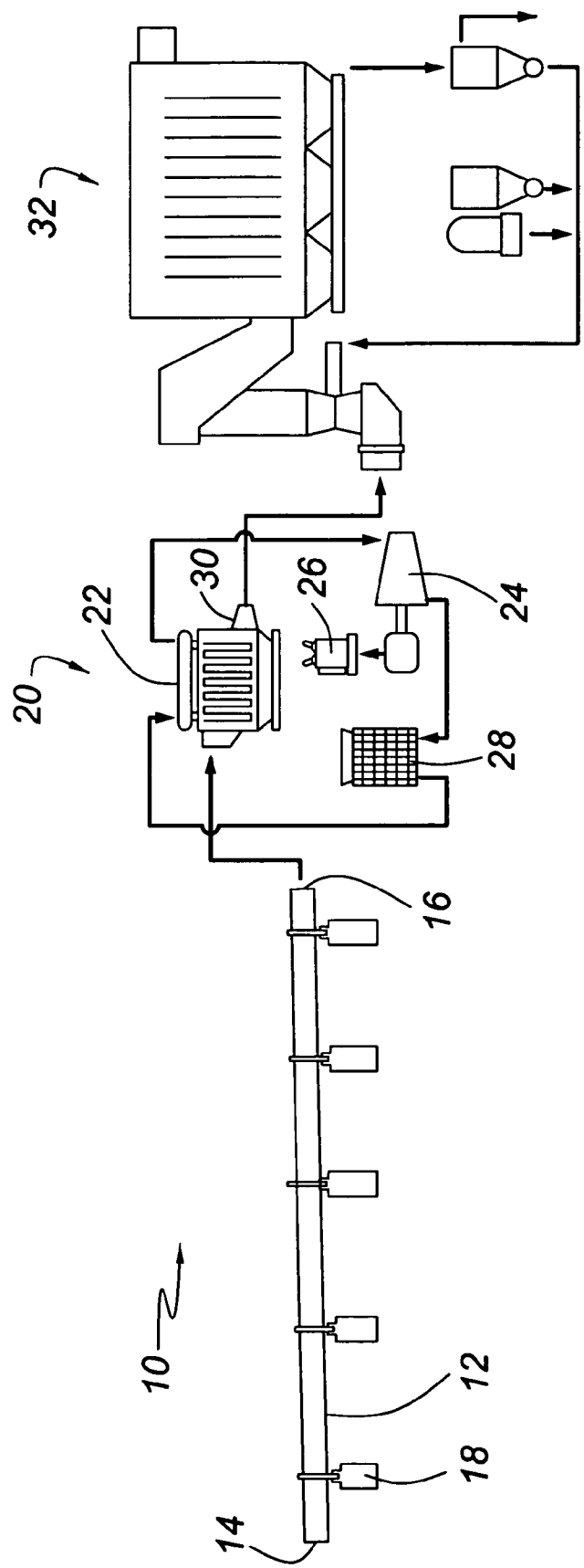
FIG. 1 is a schematic illustration of the overall system according to one embodiment.
Figure 2:
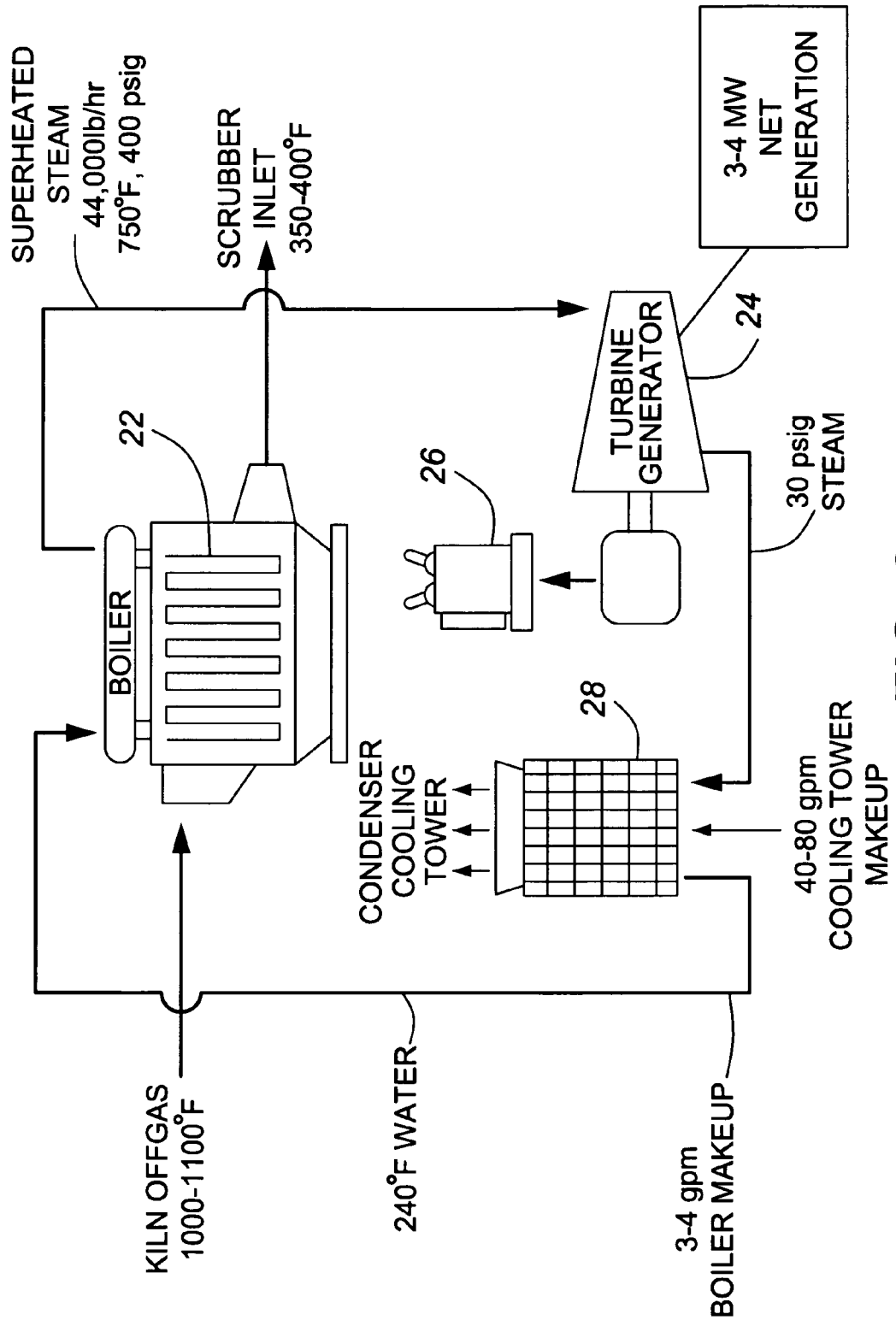
FIG. 2 is a schematic illustration of one embodiment of the waste heat recovery and power generation system used in the present invention.

Referring now to the drawings and in particular FIG. 1 and FIG. 2, shown is an overall schematic illustration of the process according to one embodiment of the present invention. The process is globally referenced by numeral 10 and provides a straight kiln 12 of the rotary variety as is known in the art having an inlet 14 and outlet 16. The kiln is supported by supports 18 and these supports also function to permit rotation of the kiln. Specific details of this arrangement will not be discussed as any suitable kiln known for lime formulation can be selected and will be readily apparent to those skilled in the art.

The discharge or offgas exiting outlet 16 is transferred into a waste heat recovery power generation circuit, globally denoted by numeral 20. The circuit includes a boiler or reboiler 22, turbine generator 24 which turbine generator is in electrical communication with an electrical storage means 26. A condenser 28 is provided to condense any excess steam and recirculate the steam as water back into boiler 22.

In greater detail, the boiler 22 receives the discharge gas or offgas from outlet 16 at an extremely high temperature, namely at a temperature between 400° F. and 2000° F. The discharge is streamed from the boiler 22 exiting the boiler, and denoted by numeral 30 is reduced to a temperature of between 300° F. and 400° F. and more particularly between 350° F. and 400° F. In this manner, the boiler 22 effectively recovers waste heat from the kiln and reduces the temperature of the stream to be scrubbed exiting at 30 a temperature which is essentially ideal for the maximum efficiency of the dry scrubber globally, denoted by the numeral 32.

The boiler functions, in effect, as a heat exchanger and exchanges the waste heat from the kiln to the water circulating within the boiler. This results in the generation of steam which is particularly useful to act as a drive means for turbine 24 for the generation of electricity.

Conventionally, boiler systems which are known to be particularly susceptible to corrosion unless operated under strict parameters, cannot be incorporated into such unit operations as set forth in FIG. 1. The low target exit temperature of the boiler needed to optimize the dry scrubber, combined with the use of sulfur-bearing fossil fuels, will lead to the formation of corrosive acidic compounds on the surface of the heat exchange surfaces. One skilled in the art would not be led to incorporate such a unit for such conditions.

It has been found that not only does the incorporation of the waste heat recovery circuit alleviate the problem with having to lower the temperature exiting the kiln 16, but also that the result is the production of electricity. In this arrangement, one skilled in the art would then be led to the conclusion that the particular fuel used to fire the kiln 12 and more particularly, the offgas 16 content would be critical for consideration in view of the fact that the boiler 22 is incorporated, which boiler 22 obviously incorporates tube networks. Normally, this would present significant difficulties in that the optimum temperature for the scrubber 32 is approximately 350° F. and this temperature requires the tube surface to be below the acid dew temperature of the sulfur compounds originating from the fuel.

By practicing the methodology as set forth herein, the LKD or CKD provided by the kiln creates a lime coating on the tubes in the boiler 22. This is an effective coating to prevent corrosion by the sulfur compounds when operating within the temperature range as noted herein and therefore permits the use of high sulfur bearing materials as a suitable fuel for firing the kiln.

Figure 3:
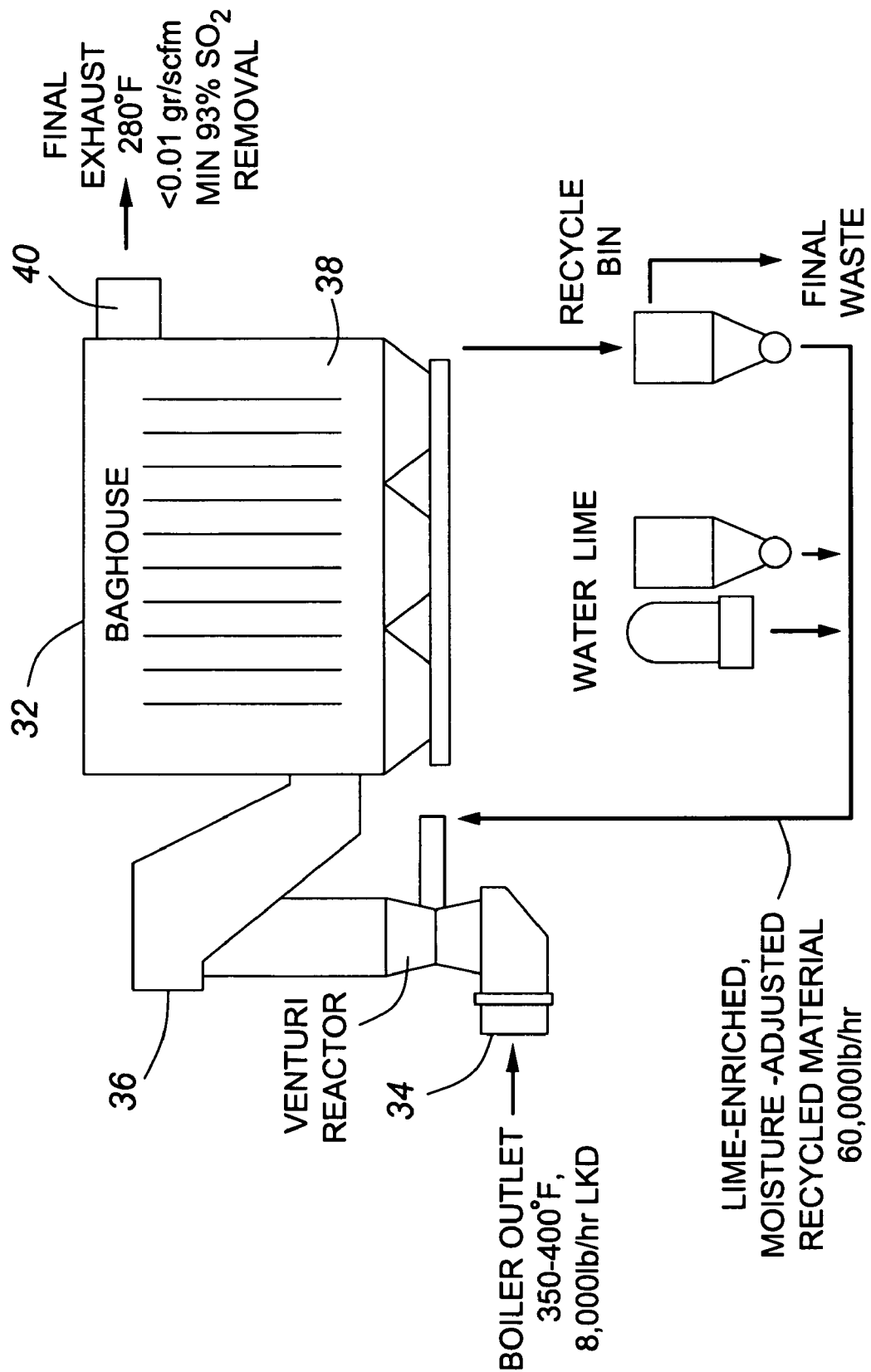
FIG. 3 is a schematic illustration of a scrubber for use in the present invention.

As a particularly convenient feature, the LKD or CKD provides the scrubbing medium required to scrub the sulfur oxide and sulfur dioxide compounds from the stream. Referring now to FIG. 3, the dry scrubber is shown in greater detail where the inlet 34 of scrubber 32 is a venturi reactor 36 which introduces the scrubbing medium to the cooled offgas followed by particulate material captured in a baghouse 38. The final exhaust exiting the baghouse at 40 has an exhaust temperature of between 250° F. and 300° F. and more particularly 280° F. with the majority of the sulfur dioxide removed therefrom.

Figure 4:
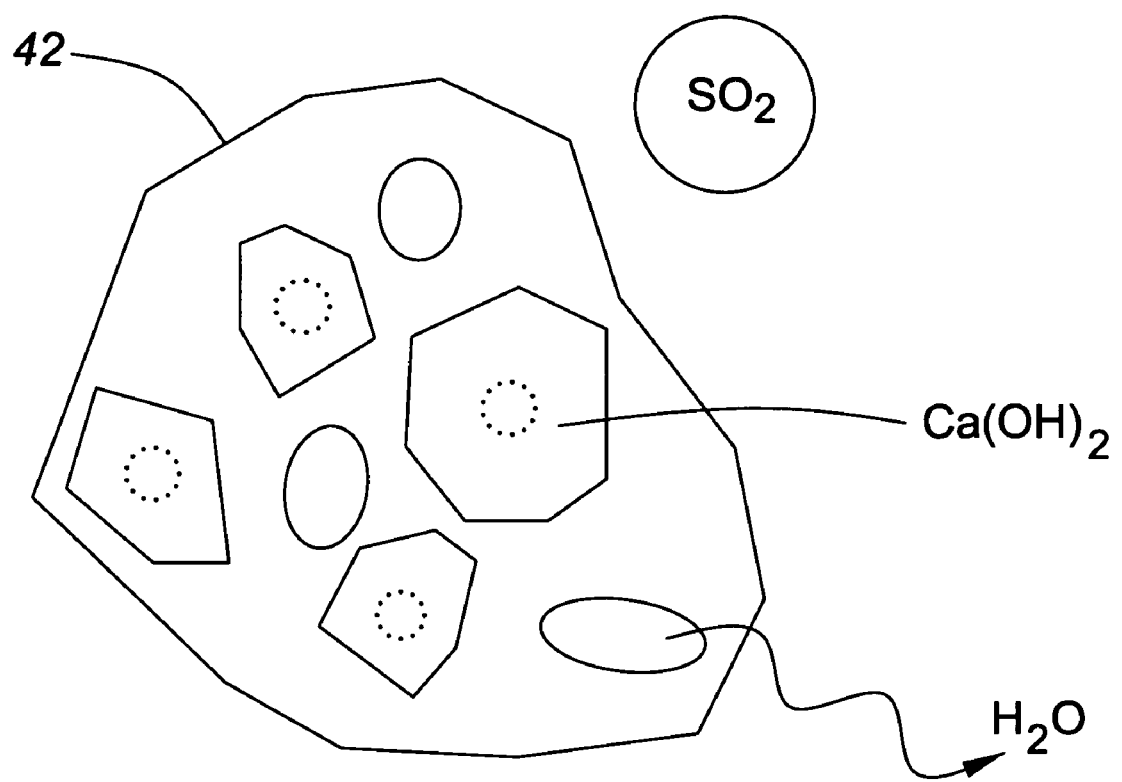
FIG. 4 is a schematic illustration of the scrubbing operation.

In respect of FIG. 4, shown is the overall scrubbing mechanism where a recycled particle 42 contains calcium hydroxide (hydrated lime) and water. In the mechanism, lime and free moisture coat the surface of the LKD or CKD and as the water evaporates the surface temperature temporarily drops below the acid dew temperature. The condensed acids combine with the lime and are therefore effectively neutralized. When the water has entirely evaporated, the particle heats to the mean gas temperature.

Figure 5:
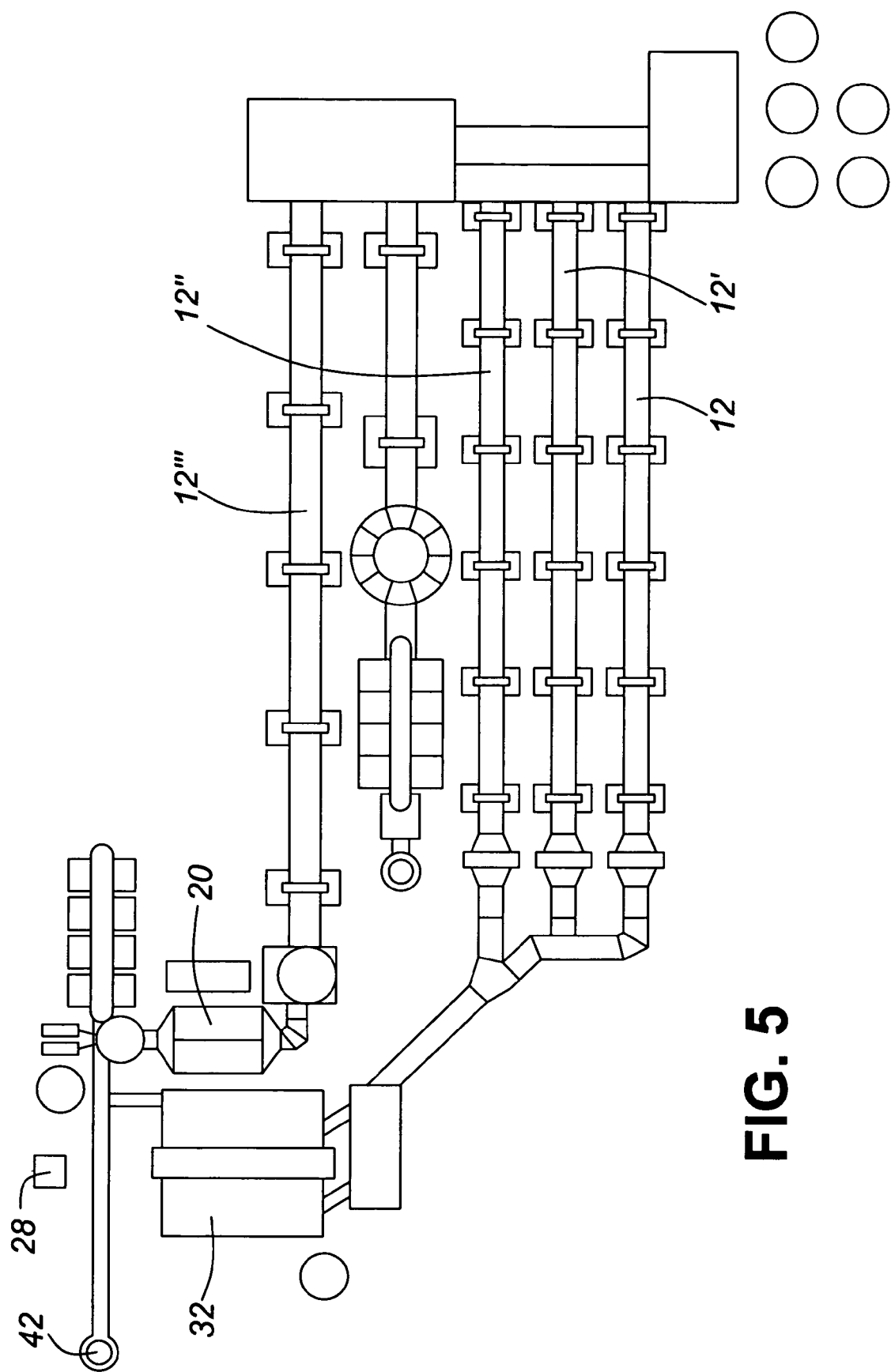
FIG. 5 is a schematic illustration of another embodiment.

FIG. 5 illustrates yet a further possible embodiment of the system according to the present invention. The overall layout incorporates a number of parallel kilns with additional kilns being indicated by 12' with subsequently increasing ' (prime) indications. A stack 42 is provided to discharge the final exhaust from outlet 40 of the baghouse 38.

It will be appreciated by those skilled in the art that compound makeup will be added where needed during the process operation of the circuits noted herein.

The embodiments of the invention described above are intended to be exemplary only. The scope of the invention is therefore intended to be limited solely by the scope of the appended claims.

We claim:

1. An integrated kiln process, comprising:
   providing a waste heat recovery circuit; said circuit including a boiler and turbine generator;
   introducing kiln offgas into said boiler, said offgas containing kiln dust and lime particles;
   collecting said lime particles on heated surfaces of said boiler to form a lime coating to reduce acidic attack when said surfaces are at temperatures below acid dew point;
   cooling said offgas to a temperature sufficient for introduction into dry scrubber, adsorbed heat within said boiler water being transferred to said turbine generator, whereby said boiler functions as a heat exchanger; and
   scrubbing said offgas.

2. The process as set forth in claim 1, wherein said lime particles accrue on heat exchange surfaces of said boiler to protect said surface from acidic attack at an optimum scrubber temperature.

3. The process as set forth in claim 1, wherein lime particles in said offgas scrub said offgas.

4. The process as set forth in claim 1, wherein said kiln is a cement kiln.

5. The process as set forth in claim 1, further including the step of providing a source of fuel to fire said kiln.

6. The process as set forth in claim 5, wherein said fuel comprises a fossil fuel.

7. The process as set forth in claim 5, wherein said fuel comprises alternate fuel.

8. The process as set forth in claim 5, wherein said fuel is a high sulphur content fuel.

9. A method for dry scrubbing gas generated from the combustion of high sulphur based fuel in a kiln process, comprising the steps of:
   providing a waste heat recovery circuit; said circuit including a boiler and turbine generator;
   providing a high sulfur content fuel for firing said kiln;
   introducing kiln offgas into said boiler, said offgas containing kiln dust and lime particles;
   collecting lime particles on heated exchange surfaces of said boiler to form a lime coating to reduce acidic attack when said surfaces are at temperatures below acid dew point; and
   scrubbing said offgas.

10. The process as set forth in claim 9, wherein said scrubbing said offgas includes forming a sorbent with said lime particles.

11. The process as set forth in claim 9, wherein said forming said sorbent includes hydrating said lime particles in said offgas.

12. The process as set forth in claim 9, wherein said kiln offgas is introduced to said boiler at a temperature of between 400° F. and 2000° F.

13. The process as set forth in claim 9, wherein cooled offgas at boiler outlet is at a temperature of between 300° F. and 400° F.

14. The process as set forth in claim 9, wherein super heated steam is transferred to said turbine generator.

15. The process as set forth in claim 9, further including the step of providing boiler feed water to said boiler.

* * * * *